US008627648B2

(12) United States Patent
Goda (10) Patent No.: US 8,627,648 B2
(45) Date of Patent: Jan. 14, 2014

(54) ENGINE CONTROL SYSTEM, ENGINE CONTROL METHOD

(75) Inventor: Hideaki Goda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 384 days.

(21) Appl. No.: 12/690,370

(22) Filed: Jan. 20, 2010

(65) Prior Publication Data

US 2010/0180578 A1 Jul. 22, 2010

(30) Foreign Application Priority Data

Jan. 20, 2009 (JP) ................................. 2009-009915

(51) Int. Cl.
*F01N 3/00* (2006.01)

(52) U.S. Cl.
USPC ............ 60/285; 60/277; 60/286; 123/568.21; 123/672; 701/108

(58) Field of Classification Search
USPC ............... 60/285, 286, 299; 123/568.21, 672; 701/108
See application file for complete search history.

(56) References Cited

U.S. PATENT DOCUMENTS

| 6,057,605 A * | 5/2000 | Bourne et al. ............... 290/40 C |
| 6,450,274 B1 * | 9/2002 | Konno et al. ............... 180/65.26 |
| 2002/0144500 A1 * | 10/2002 | Nakata ............................. 60/277 |
| 2003/0074892 A1 * | 4/2003 | Miura ............................. 60/284 |
| 2003/0154952 A1 * | 8/2003 | Osawa ..................... 123/198 DB |
| 2004/0000136 A1 * | 1/2004 | Miura ............................. 60/284 |
| 2005/0081513 A1 * | 4/2005 | Katayama et al. ............... 60/284 |
| 2006/0117739 A1 * | 6/2006 | Ichimoto et al. ................ 60/285 |
| 2008/0133114 A1 * | 6/2008 | Okubo et al. .................. 701/108 |
| 2008/0256929 A1 * | 10/2008 | Sugimoto ........................ 60/278 |
| 2009/0308055 A1 * | 12/2009 | Suzuki et al. .................... 60/285 |

FOREIGN PATENT DOCUMENTS

| JP | 10288028 | 10/1998 |
| JP | 2001037008 | 2/2001 |
| JP | 2003199208 | 7/2003 |
| JP | 2005146910 | 6/2005 |
| JP | 2005351381 A | 12/2005 |
| JP | 2008238965 | 10/2008 |

* cited by examiner

*Primary Examiner* — Thomas Denion
*Assistant Examiner* — Patrick Maines
(74) *Attorney, Agent, or Firm* — Gifford, Krass, Sprinkle, Anderson & Citkowski, P.C.

(57) ABSTRACT

An engine control system for an engine equipped with a catalyst that purifies exhaust gas includes: a catalyst temperature acquisition section that acquires the temperature of the catalyst; and a control section that controls an engine such that a rate of increase in engine output speed is changed in accordance with the temperature of the catalyst.

8 Claims, 6 Drawing Sheets

ENGINE CONTROL SYSTEM, ENGINE CONTROL METHOD

INCORPORATION BY REFERENCE

The disclosure of Japanese Patent Application No. 2009-009915 filed on Jan. 20, 2009 including the specification, drawings and abstract is incorporated herein by reference in its entirety.

BACKGROUND OF THE INVENTION

1. Field of the Invention

The present invention relates to an engine control system and an engine control method. Particularly, the present invention relates to a technology to control an engine that is equipped with a catalyst to purify exhaust gas.

2. Description of the Related Art

A hybrid vehicle equipped with a motor as a drive source in addition to an engine is generally known. In the hybrid vehicle, the engine load may be reduced with the assistance of the motor.

As with a non-hybrid vehicle that is equipped with only an engine as the drive source, the engine of the hybrid vehicle also discharges exhaust gas. Thus, it is desirable to operate the engine such that an amount of the exhaust gas is not excessive.

Japanese Patent Application Publication 2001-37008 (JP-A-2001-37008) describes that, when electricity is generated to obtain desired electric energy, the engine operation range is determined based on a discharge amount limit of exhaust emissions such as nitrogen oxide and smoke or based on a parameter that significantly affects exhaust performance. Then, the engine speed is corrected to operate the engine within the above range, and electricity is generated.

According to the technology described in JP-A-2001-37008, the increase of the exhaust emissions is reduced to a minimum level when electricity is generated. Further, the electricity generated is utilized to compensate for output when the output is required such that the discharge amount limit of the exhaust emissions may exceed. Accordingly, it is possible to reduce the amount of the exhaust gas and to improve fuel economy under various driving conditions.

The exhaust gas discharged from the engine is purified by a catalyst. The purification efficiency of the catalyst may vary in accordance with the temperature of the catalyst. For example, the catalyst cannot purify the exhaust gas until the temperature of the catalyst is equal to or above a prescribed temperature. However, if the temperature of the catalyst becomes too high, the purification efficiency of the catalyst deteriorates. Thus, as in the technology that is described in JP-A-2001-37008, even if the engine operation range is determined based on the discharge amount limit of the exhaust emissions or based on a parameter that significantly affects the exhaust performance, and even if the engine speed is corrected to operate the engine within the above range to generate electricity, the catalyst temperature may be too high to allow effective purification of the exhaust gas by the catalyst.

SUMMARY OF THE INVENTION

The present invention provides an engine control system and an engine control method that restricts a temperature increase of a catalyst.

The engine control system according to a first aspect of the present invention is an engine control system that includes a catalyst to purify exhaust gas. The engine control system includes a catalyst temperature acquisition section that acquires the temperature of the catalyst and a control section that controls an engine such that the rate of increase in engine output speed is changed in accordance with the temperature of the catalyst.

According to the above aspect, the rate of increase in engine output speed is changed in accordance with the temperature of the catalyst that purifies the exhaust gas. Accordingly, the rate at which the delivery of exhaust gas to the catalyst is increased may be changed in accordance with the temperature of the catalyst. Thus, in comparison to a case where the catalyst is at low temperature, the rate of increase in delivering the exhaust gas to the catalyst may be decreased when the catalyst is at high temperature. As a result, it is possible to provide the engine control system that restricts the temperature increase of the catalyst.

The control method of an engine according to a second aspect of the present invention is a control method of an engine that includes a catalyst to purify exhaust gas. The control method of an engine includes: acquiring the temperature of the catalyst; and controlling the engine such that a rate of increase in engine output speed is changed in accordance with the acquired temperature of the catalyst.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Embodiments of the present invention will hereinafter be described with reference to the drawings. In the following description, the same components are denoted by the same reference numerals. Their names and functions are also the same. Therefore, the description of the same components will not be repeated.

Figure 1:
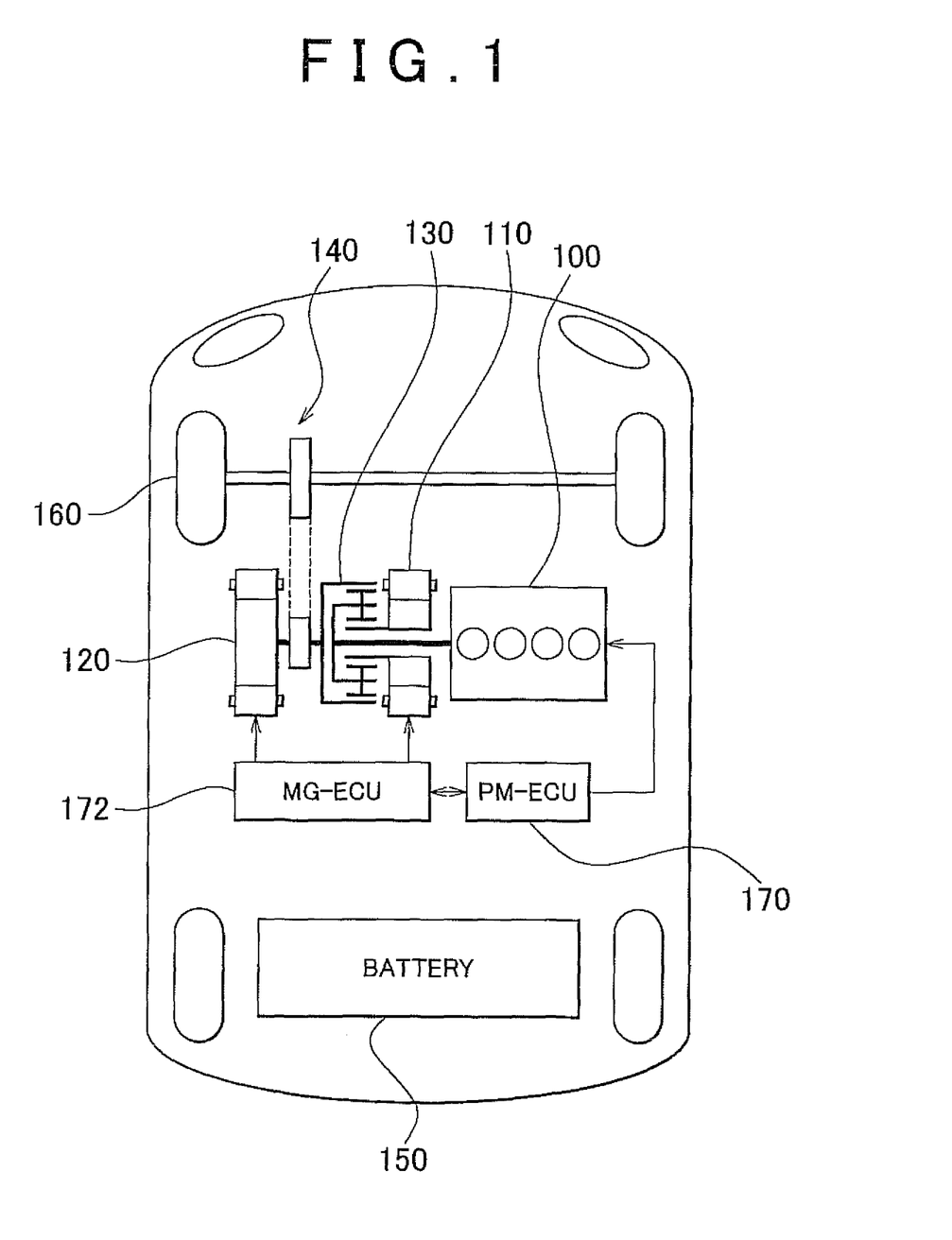
FIG. 1 shows general configuration of a hybrid vehicle according to an embodiment of the present invention.

Referring to FIG. 1, a hybrid vehicle equipped with a control system according to an embodiment of the present invention will be described. The vehicle includes an engine 100, a first motor generator (MG) 110, a second MG 120, a power split mechanism 130, a speed reducer 140, and a battery 150.

This vehicle is driven by the drive force from at least one of the engine 100 and the second MG 120. For example, the engine 100 and the second MG 120 are controlled such that the engine 100 and the second MG 120 contribute the output power to reach a target output power of the vehicle, which is set based on an accelerator operation amount the vehicle speed, and the like. The target output power of the vehicle is divided into the output power of the engine 100 and the output power of the second MG 120 at an appropriate ratio. The ratio is determined in consideration of various parameters such as fuel economy and an output power limit of the vehicle.

The engine 100, the first MG 110, and the second MG 120 are connected through the power split mechanism 130. The power generated by the engine 100 is split along two paths by the power split mechanism 130. One of the paths, which is divided by the power division mechanism 130, sends power to the front wheel 160 through the speed reducer 140. The other path, sends power to drive the first MG 110 to generate electricity.

The first MG 110 is a three-phase alternate-current (AC) rotating generator that includes a U-phase coil, a V-phase coil, and a W-phase coil. The first MG 110 generates electricity using power from the engine 100 diverted to the first MG via the power split mechanism 130. The electricity generated by the first MG 110 is utilized in accordance with the driving state of the vehicle or the state of charge (SOC) of the battery 150. For example, the electricity generated by the first MG 110 is utilized to drive the second MG 120 during normal driving. Meanwhile, if the SOC of the battery 150 is below prescribed value, the electricity generated by the first MG 110 is converted from AC to direct current (DC) by an inverter, described below. Then, the voltage of the electricity is adjusted by a converter, which will be described below, and stored in the battery 150.

When the first MG 110 operates as an electric generator, the first MG 110 generates negative torque. Negative torque is torque that becomes a load on the engine 100. When the first MG 110 receives electricity to act as a motor, the first MG 110 generates positive torque. Positive torque is torque that does not become a load on the engine 100. In other words, positive torque assists the rotation of the engine 100. The above configuration also applies to the second MG 120.

The second MG 120 is a three-phase AC rotating generator that includes a U-phase coil, a V-phase coil, and a W-phase coil. The second MG 120 is driven by at least one of the electricity that is stored in the battery 150 and the electricity that is generated by the first MG 110.

The drive force of the second MG 120 is directed to the front wheel 160 through the speed reducer 140. Accordingly, the second MG 120 assists the engine 100 and supplements the drive force applied to the vehicle. The second MG 120 may drive a rear wheel instead of the front wheel 160 or in addition to the front wheel 160.

During regenerative braking of the hybrid vehicle, the second MG 120 is driven by the front wheel 160 through the speed reducer 140 and operates as the electric generator. Thus, the second MG 120 operates as a regenerative brake that converts braking energy to electricity. The electricity that is generated by the second MG 120 is stored in the battery 150.

The power split mechanism 130 is a planetary gear train that includes a sun gear, a pinion gear, a carrier, and a ring gear. The pinion gear is engaged with the sun gear and the ring gear. The pinion gear is rotatably supported by the carrier. The sun gear is connected to a rotating shaft of the first MG 110. The carrier is connected to a crankshaft of the engine 100. The ring gear is connected to a rotating shaft of the second MG 120 and the speed reducer 140.

Figure 2:
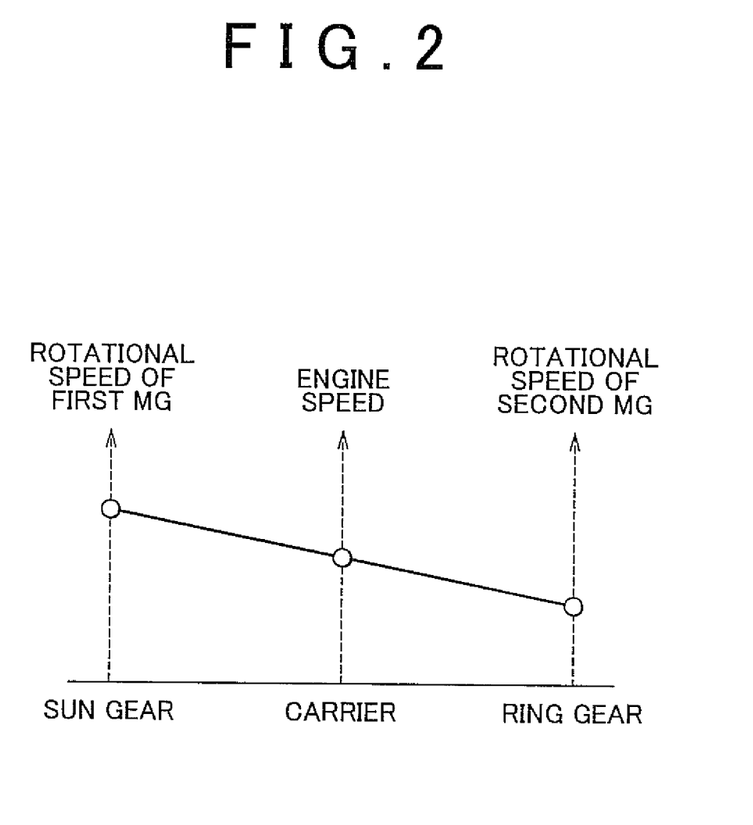
FIG. 2 shows collinearity of a power division mechanism according to the embodiment of the present invention.

The engine 100, the first MG 110, and the second MG 120 are connected through the power division mechanism 130, which is the planetary gear train. Thus, the rotational speeds of the engine 100, the first MG 110, and the second MG 120 create a collinear relationship as shown in FIG. 2.

Referring back to the FIG. 1, the battery 150 is an assembled battery in which plural battery modules are connected in series. Each of the battery modules includes integrated battery cells. The voltage of the battery 150 is approximately 200 V, for example.

According to the embodiment, the engine 100 is controlled by a powertrain manager-electronic control unit (PM-ECU) 170. The first MG 110 and the second MG 120 are controlled by an MG-ECU 172. The PM-ECU 170 and the MG-ECU 172 are communicatively connected in both directions. The PM-ECU 170 outputs commands to the MG-ECU 172 on the supply of the generated electricity of the first MG 110 and the driving electricity of the second MG 120.

Figure 3:
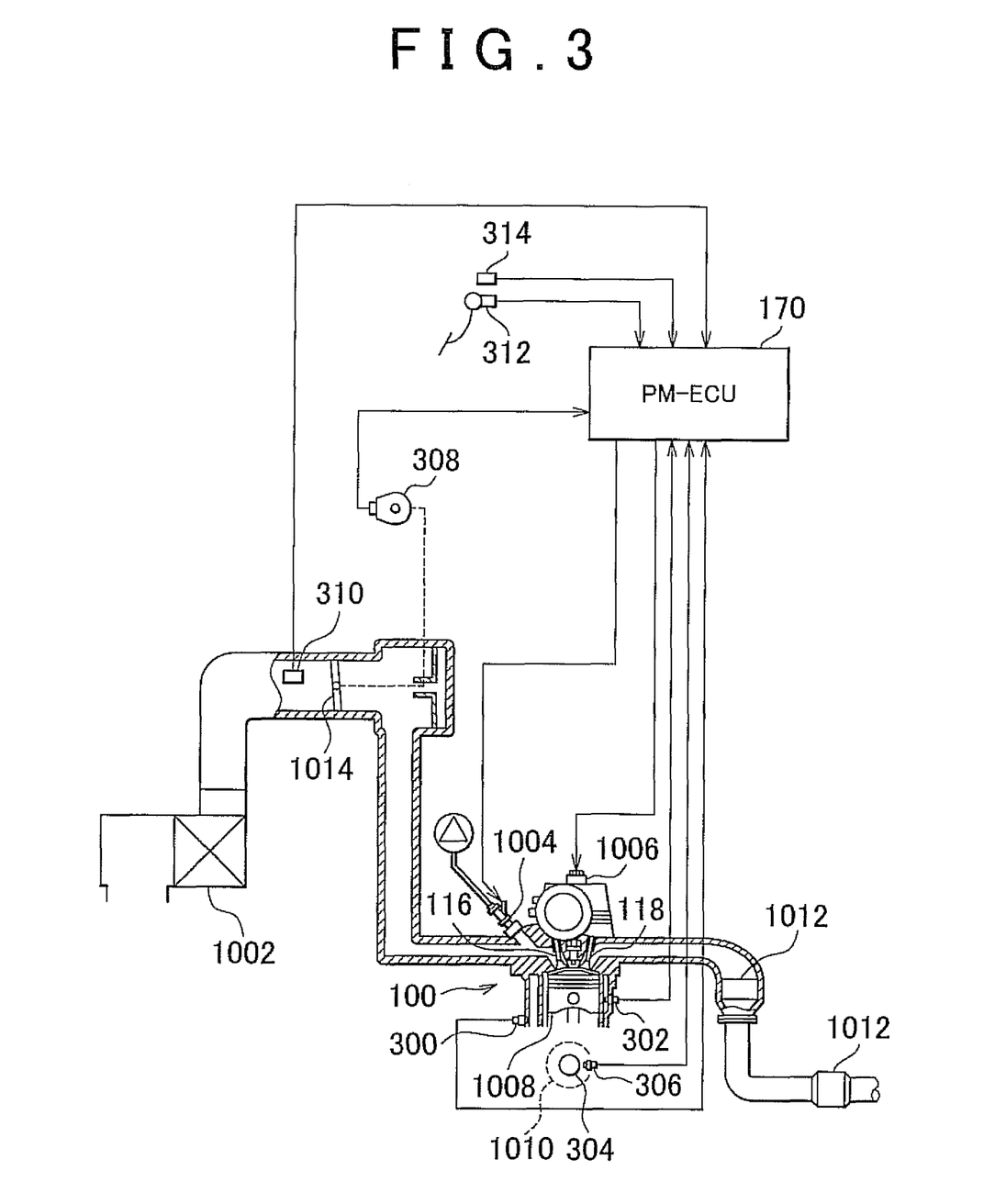
FIG. 3 shows an engine according to the embodiment of the present invention.

The engine 100 will be further described with reference to FIG. 3. The engine 100 is an internal combustion engine in which air-fuel mixture is ignited by a spark plug 1006 and combusted in a combustion chamber. The air-fuel mixture is a mixture of air that is drawn from an air cleaner 1002 and fuel that is injected by an injector 1004. The ignition timing is advanced minimally for best torque (MBT) at which the output torque reaches a maximum value. However, the ignition timing is delayed or advanced in accordance with the operational state of the engine 100, such as occurrence of knock.

When the air-fuel mixture is combusted, a piston 1008 is pushed down by combustion pressure, causing a crankshaft 1010 to rotate. The combusted air-fuel mixture (exhaust gas) is purified by a three-way catalyst 1012, which is provided in the engine 100, before being discharged from the vehicle. The three-way catalyst 1012 promotes its purification effect by being heated to a particular temperature. The amount of the air that is drawn to the engine 100 is regulated by a throttle valve 1014.

The PM-ECU 170 that controls the engine 100 is connected to a knock sensor 300, a coolant temperature sensor 302, a crank position sensor 306 that is provided opposite a timing rotor 304, a throttle opening sensor 308, an airflow meter 310, an accelerator operation amount sensor 312, and a vehicle speed sensor 314.

The knock sensor 300 is provided in a cylinder block of the engine 100. The knock sensor 300 includes a piezoelectric element. The knock sensor 300 generates voltage by the vibration of the engine 100. The magnitude of the voltage corresponds to the degree of the vibration. The knock sensor 300 transmits a signal that indicates the magnitude of the generated voltage to the PM-ECU 170.

The coolant temperature sensor 302 detects the temperature of coolant in a water jacket of the engine 100 and transmits a signal that indicates the detected coolant temperature to the PM-ECU 170.

The timing rotor 304 is provided on and rotates with the crankshaft 1010. A plurality of projections are formed along the outer circumference of the timing rotor 304 at specified intervals. The crank position sensor 306 is provided opposite to and facing the projections of the timing rotor 304. A gap distance between the projections of the timing rotor 304 and the crank position sensor 306 changes as the timing rotor 304 rotates. Thus, a magnetic flux that passes through the coil of the crank position sensor 306 fluctuates, and thereby, an electromotive force is generated in the coil. The crank position sensor 306 transmits a signal that indicates the detected electromotive force to the PM-ECU 170. Based on the signal that is transmitted from the crank position sensor 306, the PM-ECU 170 determines the crank angle and engine speed NE (i.e., the rotational speed of the crankshaft 1010).

The throttle-opening sensor 308 detects throttle opening amount and transmits a signal that indicates the detected opening amount to the PM-ECU 170.

The airflow meter 310 detects the amount of the air that is drawn to the engine 100 and transmits a signal that indicates the detected amount of airflow to the PM-ECU 170.

The accelerator operation amount sensor 312 detects the operation amount of an accelerator pedal and transmits a signal that indicates the detected operation amount to the PM-ECU 170. The vehicle speed sensor 314 detects the vehicle speed and transmits a signal that indicates the detected vehicle speed to the PM-ECU 170.

Figure 4:
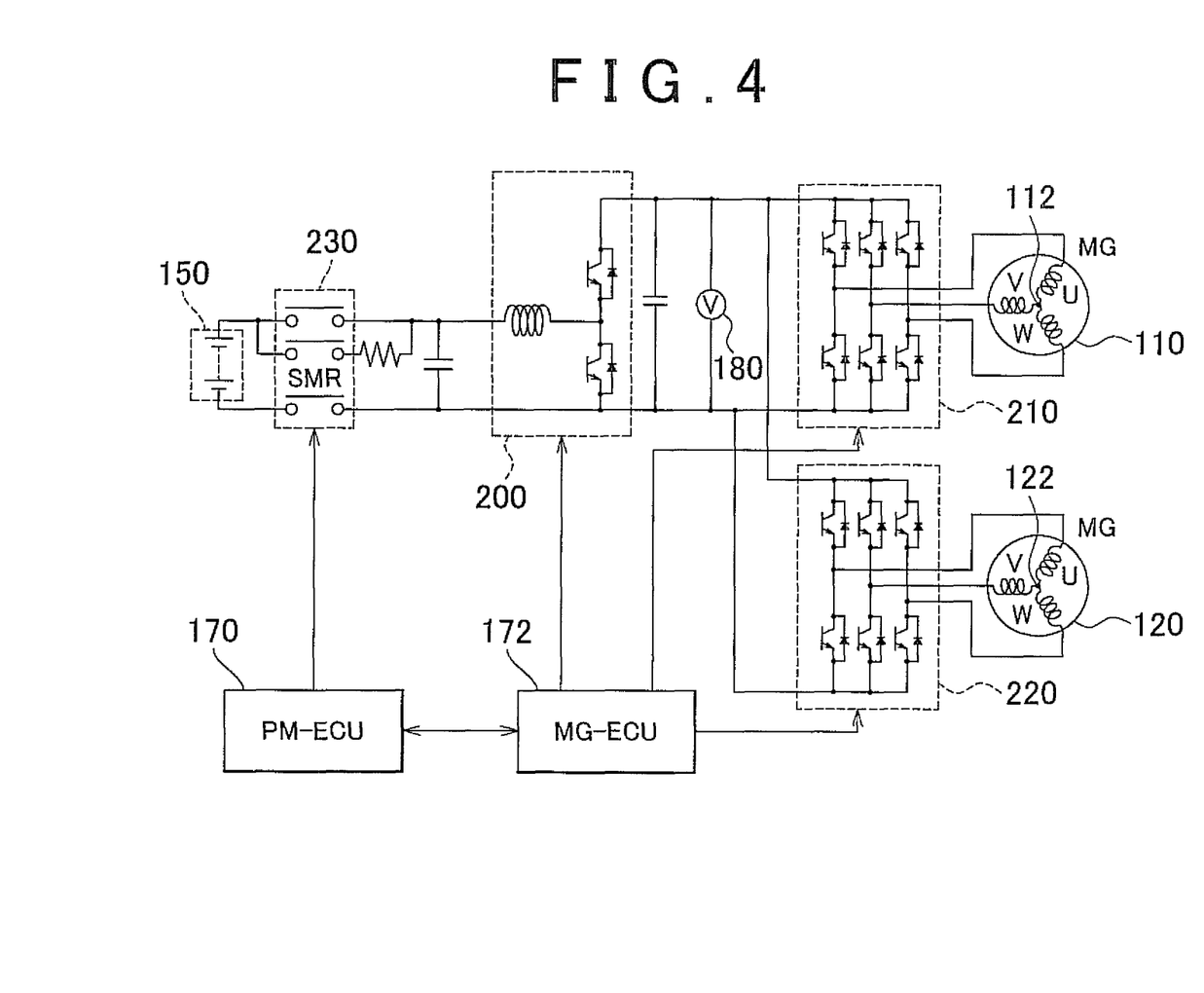
FIG. 4 shows an electric system of the hybrid vehicle according to the embodiment of the present invention.

An electrical system of the hybrid vehicle will be further described with reference to FIG. 4. The hybrid vehicle includes a converter 200, a first inverter 210, a second inverter 220, and a system main relay (SMR) 230.

The converter 200 includes a reactor, two NPN transistors, and two diodes. One end of the reactor is connected to the cathode of the battery 150, and the other end of the reactor is connected to a connecting point of the two NPN transistors.

The two NPN transistors are connected in series. The NPN transistors are controlled by the MG-ECU 172. Each of the diodes is connected between a corrector and an emitter of the corresponding NPN transistor so that electricity flows from the emitter side to the corrector side.

An insulated gate bipolar transistor (IGBT) may be employed as the NPN transistor, for example. Instead of the NPN transistor, a power switching element such as a power metal oxide semiconductor field-effect transistor (power MOSFET) can be utilized.

When the electricity that is discharged from the battery 150 is supplied to the first MG 110 or the second MG 120, the voltage is increased by the converter 200. On the other hand, when the electricity that is generated by the first MG 110 or the second MG 120 is used to charge the battery 150, the voltage is reduced by the converter 200.

A system voltage VH between the converter 200 and the first inverter 210 and between the converter 200 and the second inverter 220 is detected by a voltage sensor 180. The voltage detected by the voltage sensor 180 is transmitted to the MG-ECU 172.

The first inverter 210 includes a U-phase arm, a V-phase arm, and a W-phase arm. The U-phase arm, the V-phase arm, and the W-phase arm are connected in parallel. Each of the U-phase arm, the V-phase arm, and the W-phase arm includes two NPN transistors that are connected in series. Each diode is connected between the corrector and the emitter of the corresponding NPN transistor so that electricity flows from the emitter to the corrector. A connecting point between the NPN transistors of each arm is connected to one end of each coil of the first MG 110 that differs from a neutral point 112 of each coil.

The first inverter 210 converts direct current that is supplied from the battery 150 to alternating current, and supplies the alternating current to the first MG 110. The first inverter 210 also converts the alternating current that is generated by the first MG 110 to direct current.

The second inverter 220 includes the U-phase arm, the V-phase arm, and the W-phase arm. The U-phase arm, the V-phase arm, and the W-phase arm are connected in parallel. Each of the U-phase arm, the V-phase arm, and the W-phase arm includes the two NPN transistors that are connected in series. Each diode is connected between the corrector and the emitter of the corresponding NPN transistor so that electricity flows from the emitter to the corrector. The connecting point between the NPN transistors of each arm is connected to one end of each coil of the second MG 120 that differs from a neutral point 122 of each coil.

The second inverter 220 converts the direct current that is supplied from the battery 150 to the alternating current, and supplies the alternating current to the second MG 120. The second inverter 220 also converts the alternating current that is generated by the second MG 120 to the direct current.

The converter 200, the first inverter 210, and the second inverter 220 are controlled by the MG-ECU 172. The MG-ECU 172 has a function to control the converter 200, the first inverter 210, and the second inverter 220, and also has a function to detect failure (abnormality) of the converter 200, the first inverter 210, and the second inverter 220.

For example, the MG-ECU 172 detects failure when the system voltage VH that is detected by the voltage sensor 180, input or output current that is detected by a current sensor (not shown), the temperature of the converter 200, the first inverter 210, or the second inverter 220 that is detected by a temperature sensor (not shown), or the like is equal to or higher than a threshold value. When the MG-ECU 172 detects the failure, a signal that represents the failure is transmitted from the MG-ECU 172 to the PM-ECU 170.

The SMR 230 is provided between the battery 150 and the converter 200. The SMR 230 is a relay that switches between a state in which the battery 150 and the electric system are connected and a state in which the battery 150 and the electric system are disconnected. When the SMR 230 is open, the battery 150 is disconnected from the electric system. When the SMR 230 is closed, the battery 150 is connected with the electric system.

More specifically, when the SMR 230 is open, the battery 150 is electrically disconnected from the converter 200 and the like. When the SMR 230 is closed, the battery 150 is electrically connected with the converter 200 and the like.

The SMR 230 is controlled by the PM-ECU 170. For example, when the PM-ECU 170 is activated, the SMR 230 is closed. When the PM-ECU 170 is deactivated, the SMR 230 is opened.

Figure 5:
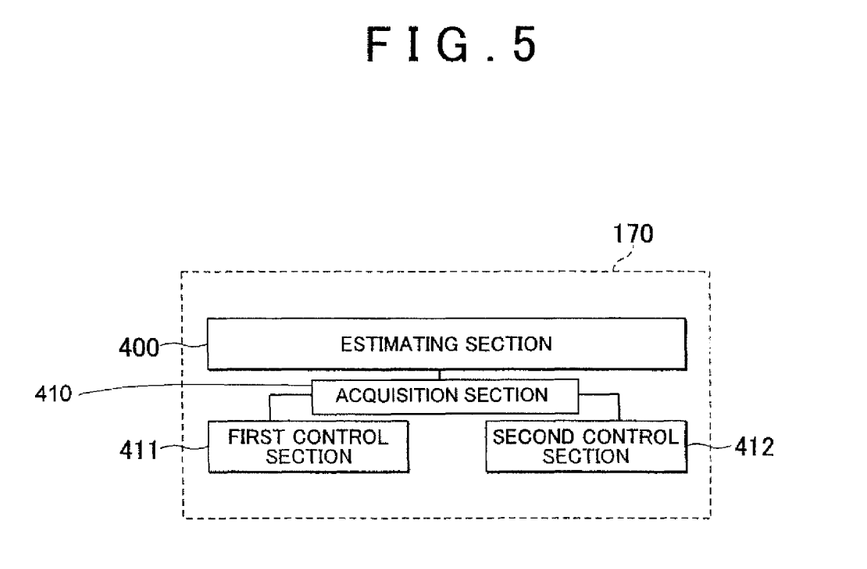
FIG. 5 is a function block diagram of a powertrain mechanism-electric control unit (PM-ECU) according to the embodiment of the present invention.

The function of the PM-ECU 170 will be further described with reference to FIG. 5. It should be noted that the function described below may be implemented by software or hardware.

The PM-ECU 170 includes an estimating section 400, an acquisition section 410, a first control section 411, and a second control section 412. The estimating section 400 estimates the temperature of the three-way catalyst 1012. For example, the temperature of the three-way catalyst 1012 may be estimated based on parameters such as the engine speed (output speed of the engine 100) NE, the load that is calculated from a intake air amount (load rate), or the time period that has elapsed since the activation of the engine 100. The acquisition section 410 acquires the estimated temperature of catalyst 1012 from the estimating section 400.

Through an experiment and a simulation that are conducted during a development stage of the engine 100, a map depicting the relationship between the temperature of the three-way catalyst 1012 and the parameters such as the engine speed NE, the load, and the time period that elapsed since the activation of the engine 100 may be created and stored in memory. The PM-ECU 170 then estimates the temperature of the three-way catalyst 1012 using the map.

A conventional method may also be utilized as a method to estimate the temperature of the three-way catalyst 1012. Thus, the method will not be described in detail repeatedly. Instead of estimating the temperature of the three-way catalyst 1012, the temperature of the three-way catalyst 1012 may directly be detected by utilizing a temperature sensor or the like connected to the acquisition section 410.

The first control section 411 controls the engine 100 so that the rate of increasing the engine speed NE changes in accordance with the temperature of the three-way catalyst 1012 received from the acquisition section 410. More specifically, when the SOC of the battery 150 is equal to or above a threshold SOC, the engine 100 is controlled so that the rate of increase in the engine speed NE is decreased inversely with increases in the temperature of the three-way catalyst 1012. In other words, if the motor can sufficiently assist the engine, the engine is controlled such that the rate of increase in engine speed is decreased inversely with increases in the temperature of the three-way catalyst 1012. Accordingly, the temperature increase of the catalyst is restricted without degrading the acceleration of the vehicle.

The second control section 412 controls the engine 100 such that the load on the engine 100 is reduced inversely with increases in the temperature of the three-way catalyst 1012 received from the acquisition section 410. Thus, compared to a case when the catalyst temperature is low, the amount of the exhaust gas that is delivered to the catalyst may be reduced when the catalyst is at high temperature. Therefore, the temperature increase of the catalyst can be restricted.

Figure 6:
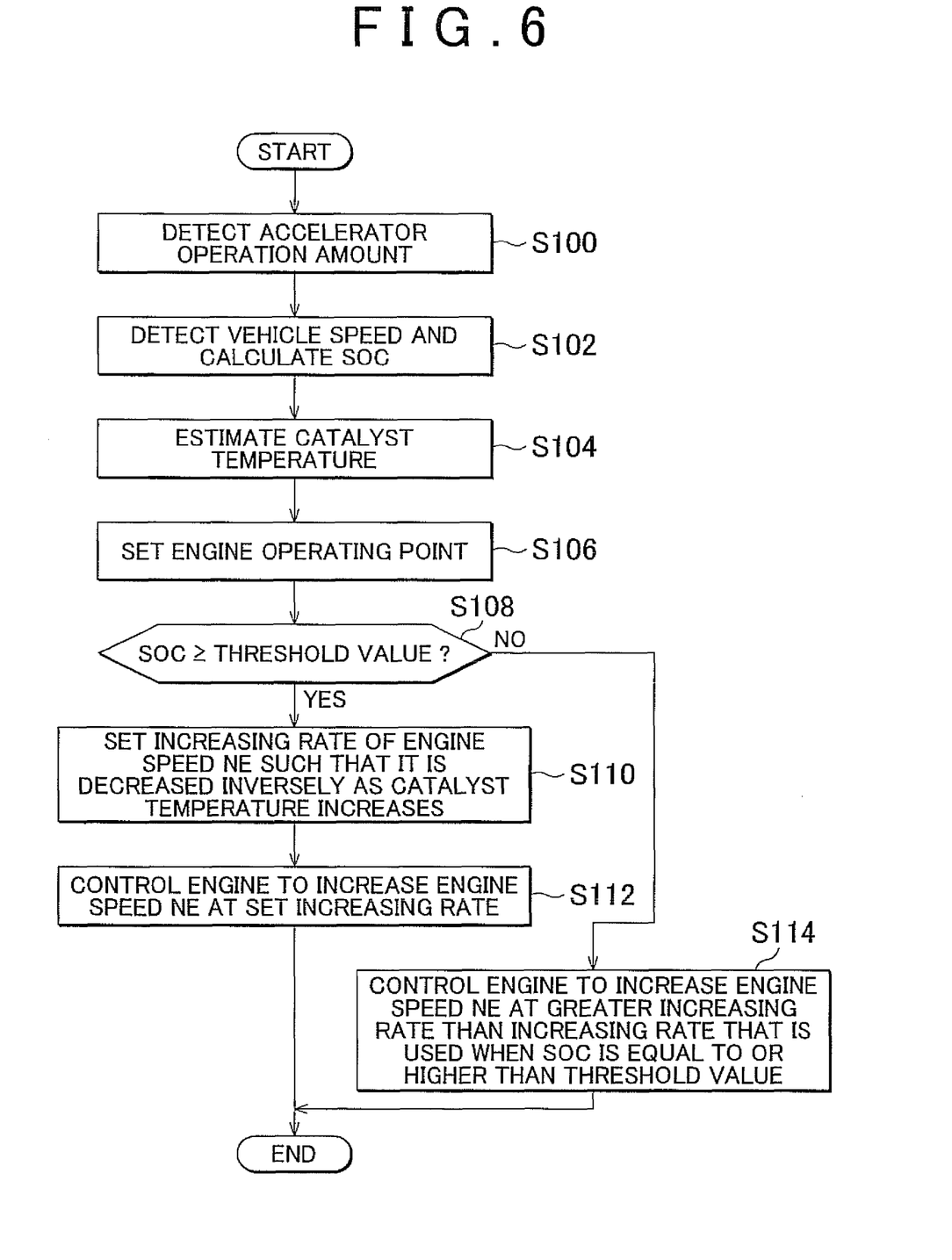
FIG. 6 is a flowchart that shows control structure of a program to be executed by the PM-ECU according to the embodiment of the present invention.

Next, the control structure of a program to be executed by the PM-ECU 170 will be described with reference to FIG. 6.

In step (hereinafter abbreviated as "S") 100, the PM-ECU 170 detects the accelerator operation amount. The accelerator operation amount may be detected by utilizing a conventional technology, such as an accelerator operation amount sensor. Thus, a detection method of the accelerator operation amount will not be described in detail.

In S102, the PM-ECU 170 detects the vehicle speed and calculates the SOC of the battery 150. The SOC of the battery 150 may be calculated by utilizing a conventional technology. For example, the SOC of the battery 150 can be calculated from the voltage of the battery 150 or integrated from of the input and output currents of the battery 150. Thus, a calculation method of the SOC will not be described in detail.

In S104, the PM-ECU 170 estimates the temperature of the three-way catalyst 1012. In S106, the PM-ECU 170 determines an operating point of the engine 100 in accordance with the accelerator operation amount, the vehicle speed, the SOC of the battery 150, the temperature of the three-way catalyst 1012, and the like. In the embodiment, the operating point of the engine indicates a target output power of the engine 100. The output power of the engine 100 is expressed by a product of the engine speed NE and the output torque of the engine 100. Thus, upon determination of the operating point of the engine 100, the target output speed, the target output torque, and the like of the engine 100 may be determined.

In the embodiment, the operating point of the engine 100 is determined such that the load on the engine 100 is reduced inversely with increases in temperature of the three-way catalyst 1012. However, the operating point of the engine 100 may be determined without consideration of the temperature of the three-way catalyst 1012.

In S108, the PM-ECU 170 determines whether the SOC of the battery 150 is equal to or above the threshold SOC. In other words, it is determined whether the SOC of the battery 150 is sufficient. If the SOC of the battery 150 is equal to or above the threshold SOC (YES in S108), the process proceeds to S110. If not (NO in S108), the process proceeds to S114.

In S110, the PM-ECU 170 sets the increase rate of the engine speed NE to be decreased inversely with increases in the temperature of the three-way catalyst 1012. The rate of increase in engine speed NE may be determined in consideration of the accelerator operation amount, the vehicle speed, and the like, in addition to the temperature of the three-way catalyst 1012.

In S112, the PM-ECU 170 controls the engine 100 such that the engine speed NE is increased at the set rate of increase until the actual operating point of the engine 100 reaches the determined operating point.

In S114, the PM-ECU 170 controls the engine 100 such that the engine speed NE is increased at a rate of increase that is higher than that utilized when the SOC of the battery 150 is equal to or higher than the threshold SOC, until the actual operating point of the engine 100 reaches the determined operating point. The rate of increase for the engine speed NE may be determined in consideration of the accelerator operation amount, the vehicle speed, and the like.

The operation of the engine 100 that is based on the above structure and the above flowchart is described below.

During running of the vehicle, the accelerator operation amount is detected (S100). In addition, the vehicle speed is detected, and the SOC of the battery 150 is calculated (S102). Further, the temperature of the three-way catalyst 1012 is estimated (S104).

The operating point of the engine 100 is determined in accordance with the accelerator operation amount, the vehicle speed, the SOC of the battery 150, the temperature of the three-way catalyst 1012, and the like (S106). In the embodiment, the operating point of the engine 100 is determined such that the load of the engine 100 is reduced inversely with increases in the temperature of the three-way catalyst 1012, and eventually, the engine 100 is controlled so that the actual operating point of the engine 100 reaches the determined operating point (S112, S114). Thus, compared to when the temperature of the three-way catalyst 1012 is low, it is possible to reduce the amount of the exhaust gas that is delivered to the three-way catalyst 1012 when the temperature of the three-way catalyst 1012 is high. Therefore, the temperature increase of the three-way catalyst 1012 may be restricted.

However, if the SOC of the battery 150 is equal to or above the threshold SOC (YES in S108), that is, if the SOC of the battery 150 is sufficient, even if the output power of the engine 100 is gently increased, an acceleration request by a driver is met by supplementing the output power with the output power of the second MG 120.

Accordingly, if the SOC of the battery 150 is equal to or above the threshold SOC (YES in S108), the rate of increase in the engine speed NE is set to be decreased inversely with increases in the temperature of the three-way catalyst 1012 (S110). Subsequently, the engine 100 is controlled such that the engine speed NE is increased at the set rate of increase until the actual operating point of the engine 100 reaches the determined operating point.

Thus, compared to the case where the temperature of the three-way catalyst 1012 is low, it is possible to reduce the amount of the exhaust gas that is delivered to the three-way catalyst 1012 when the temperature of the three-way catalyst 1012 is high. Therefore, the temperature increase of the three-way catalyst 1012 may be restricted.

On the other hand, if the SOC of the battery 150 is below the threshold SOC (NO in S108), that is, if the SOC of the battery 150 is insufficient, an assisted amount of the engine 100 with the second MG 120 is restricted. Thus, the acceleration request by the driver cannot be met unless the output power of the engine 100 is immediately increased.

Considering the above, if the SOC of the battery 150 is below the threshold value (NO in S108), the engine 100 may be controlled so that the engine speed NE is increased at a rate higher than the increasing rate used when the SOC of the battery 150 is equal to or exceeds the threshold value, until the actual operating point of the engine 100 reaches the determined operating point (S114).

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. An engine control system that includes a catalyst to purify exhaust gas from an engine, the engine control system comprising:
    an electronic control unit having a catalyst temperature acquisition section and a control section;
    the catalyst temperature acquisition section acquires a temperature of the catalyst; and
    the control section determines an operating point of the engine such that a load of the engine is reduced as the temperature of the catalyst increases, the control section sets a rate of increase in engine output speed so that the rate of increase in engine output speed decreases as the temperature of the catalyst increases, and the control section controls the engine so that an engine output speed increases at the set rate of increase until an actual operating point of the engine reaches the determined operating point.

2. The engine control system according to claim 1, further comprising a catalyst temperature estimation section that estimates the temperature of the catalyst
    wherein the catalyst temperature acquisition section acquires the temperature of the catalyst estimated by the catalyst temperature estimation section.

3. The engine control system according to claim 1, further comprising:
    a battery; and
    a motor that is driven by electricity that is supplied from the battery,
    wherein:
    the engine is installed in a vehicle that is equipped with the motor as a drive source, and
    the control section controls the engine such that the rate of increase in the engine output speed decreases as the temperature of the catalyst increases if a state-of-charge of the battery is at least equal to a threshold state-of-charge.

4. The engine control system according to claim 3, wherein, if the state-of-charge of the battery is below the threshold state-of-charge, the control section controls the engine such that the rate of increase in engine output speed decreases, as the temperature of the catalyst increases, at a greater rate than the decrease in the rate of increase used when the state of charge of the battery is at least equal to the threshold state-of-charge.

5. A control method of an engine that includes a catalyst to purify exhaust gas from the engine, the method comprising:
    acquiring temperature of the catalyst;
    determining an operating point of the engine so that a load of the engine is reduced as the temperature of the catalyst increases;
    setting a rate of increase in engine output speed so that the rate of increase in engine output speed decreases as the temperature of the catalyst increases; and
    controlling the engine so that the engine output speed increases at the set rate of increase until an actual operating point of the engine reaches the determined operating point.

6. The engine control system accordingly to claim 1, wherein the control section sets the determined operating point of the engine based on a target engine speed and a target engine torque, and the control section controls the rate of increase in engine output speed occurring at a period of time when the actual operating point of the engine changes to the determined operating point of the engine.

7. The control method accordingly to claim 5,
    wherein setting the determined operating point of the engine is based on a target engine speed and a target engine torque; and
    controlling the rate of increase in engine output speed occurring at a period of time when the actual operating point of the engine changes to the determined operating point of the engine.

8. An engine control system comprising:
    a catalyst to purify exhaust gas from an engine; and
    an electronic control unit operable to control the engine, the electronic control unit having a catalyst temperature acquisition section and a control section;
    the catalyst temperature acquisition section acquires a temperature of the catalyst;
    the control section determines an operating point of the engine such that a load of the engine is reduced as the temperature of the catalyst increases, the control section sets a rate of increase in engine output speed so that the rate of increase in engine output speed decreases as the temperature of the catalyst increases, and the control section controls the engine so that an engine output speed increases at the set rate of increase until an actual operating point of the engine reaches the determined operating point.

* * * * *